United States Patent
Krolewski et al.

(10) Patent No.: US 10,696,131 B2
(45) Date of Patent: Jun. 30, 2020

(54) METHOD FOR DETERMINING THE SURROUNDING AIR TEMPERATURE OF A MOTOR VEHICLE

(71) Applicant: FORD GLOBAL TECHNOLOGIES, LLC, Dearborn, MI (US)

(72) Inventors: Sandra Krolewski, Neuss NRW (DE); Dietmar Fischer, Cologne NRW (DE); Klaus Schuermanns, Cologne NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/956,331

(22) Filed: Apr. 18, 2018

(65) Prior Publication Data
US 2018/0304720 A1  Oct. 25, 2018

(30) Foreign Application Priority Data
Apr. 21, 2017  (DE) .......................... 10 2017 206 724

(51) Int. Cl.
*B60H 1/00*  (2006.01)
*G05D 23/19*  (2006.01)
*B60R 1/06*  (2006.01)

(52) U.S. Cl.
CPC ....... *B60H 1/0075* (2013.01); *B60H 1/00792* (2013.01); *B60H 1/00807* (2013.01); *G05D 23/1931* (2013.01); *B60R 1/06* (2013.01)

(58) Field of Classification Search
CPC ............. B60H 1/0075; B60H 1/00792; B60H 1/00807; B60R 1/06; G05D 23/1931
See application file for complete search history.

(56) References Cited

U.S. PATENT DOCUMENTS

| | | | | |
|---|---|---|---|---|
| 5,416,728 A | * | 5/1995 | Rudzewicz | G01K 1/20 340/449 |
| 5,568,732 A | * | 10/1996 | Isshiki | F25B 13/00 62/129 |

(Continued)

FOREIGN PATENT DOCUMENTS

| | | | |
|---|---|---|---|
| DE | 102015111876 A1 | | 1/2017 |
| KR | 201400545666 | * | 1/2009 |
| KR | 20140054566 A | | 5/2014 |

OTHER PUBLICATIONS

DE Examination Report for Application No. 10 2017 206 724.1 dated Jan. 25, 2018. 8 pages.

*Primary Examiner* — Henry T Crenshaw
(74) *Attorney, Agent, or Firm* — Frank Lollo; Brooks Kushman P.C.

(57) ABSTRACT

A method for operating a climate-control system of a vehicle using an initial ambient (outside the vehicle) air temperature calculated based upon a current air temperature measured by a temperature sensor located on a side-mirror of the vehicle. A previous air temperature is stored at or before an engine shut-down time. At a subsequent engine start time: a) the temperature sensor on the side-mirror determines the current air temperature; b) a solar radiation on the vehicle is measured; and c) a duration since the previous air temperature was stored is determined. If, at the engine re-start time; a) the duration exceeds a threshold value; and b) the current air temperature is higher than the previous air temperature, then the initial air temperature is calculated from: a) the current air temperature, b) the previous air temperature, and c) the solar radiation. The climate-control system is operated using the calculated initial temp.

16 Claims, 3 Drawing Sheets

(56) References Cited

U.S. PATENT DOCUMENTS

| | | | |
|---|---|---|---|
| 7,629,562 B2* | 12/2009 | Kuechler | B60H 1/00792 250/203.4 |
| 2006/0209921 A1* | 9/2006 | Brown | G01K 1/20 374/109 |
| 2009/0016405 A1* | 1/2009 | Kubota | G01K 1/20 374/142 |
| 2011/0106505 A1* | 5/2011 | Hawkins | G01K 7/42 703/2 |
| 2011/0271697 A1* | 11/2011 | Sunaga | B60H 1/0075 62/126 |
| 2013/0070804 A1* | 3/2013 | Hawkins | G01K 7/42 374/1 |
| 2018/0195911 A1* | 7/2018 | Kakade | G01K 13/02 |

* cited by examiner

METHOD FOR DETERMINING THE SURROUNDING AIR TEMPERATURE OF A MOTOR VEHICLE

CROSS-REFERENCE TO RELATED APPLICATIONS

This application claims foreign priority benefits under 35 U.S.C. § 119(a)-(d) to Application DE 10 2017 206 724.1 filed Apr. 21, 2017, which is hereby incorporated by reference in its entirety.

TECHNICAL FIELD

The invention relates to a method for determining the air temperature in the surroundings of a vehicle on the basis of temperature measurements of a temperature sensor which is installed in a side-mirror of the vehicle, a method for determining an initial value for the air temperature after the vehicle has been stationary, and a motor vehicle having a system operative to perform the above methods.

BACKGROUND

KR 2014 0054566 A teaches a method of determining the air temperature in the surroundings of a motor vehicle on the basis of temperature measurements of at least one temperature sensor that is installed in a side-mirror of the vehicle. The surrounding air temperature measured in such a way may not match the actual surrounding air temperature with a desired level of accuracy.

External temperature sensors, which conventionally are arranged in the proximity of the front radiator, are subject to the influence of engine heat. Taking the influence of engine heat into account is known from US 2006/0209921 A1, wherein temperature measurements obtained at higher vehicle speeds are deemed to be valid, and at lower vehicle speeds the temporal curve of the temperature measurements is extrapolated to obtain a temperature measurement deemed to be valid. Further methods for determining the air temperature in the surroundings of a motor vehicle on the basis of temperature measurements of temperature sensors close to the engine are disclosed in US 2011/0106505 A1 and in US 2009/0016405 A1.

A temporal extrapolation of the temperature measurements may be performed, for example, using a Kalman filter. During positive temperature trends, such an extrapolation may require a relatively long stabilization time in order to obtain a trustworthy result. This may also be the case if the temperature sensor are moved from the front radiator to a side-mirror, where, although it is true that the raw temperature measurement is not subject to the influence of engine heat, it can however be distorted by solar radiation. Some kind of correction method, as is known for temperature sensors close to the engine, is therefore also necessary for side-mirror temperature sensors if maximum accuracy is to be obtained.

It would be advantageous to devise a method for determining the surrounding air temperature of a vehicle by means of a side-mirror temperature sensor (or sensors) which provides a result in a simpler and faster manner than correction methods for temperature sensors close to the engine, where said result can be deemed with adequate reliability to be representative of the true surrounding air temperature.

SUMMARY

According to one method disclosed herein, the current solar radiation on the vehicle is measured, and a current temperature measurement is deemed to be a valid value for the surrounding air temperature and is used if the current temperature measurement is lower than a most recently measured valid temperature measurement or if the current vehicle speed is above a predetermined speed threshold value or if the measured value for the solar radiation is below a predetermined solar radiation threshold value. Otherwise, the most recently measured valid temperature measurement is used as the value for the surrounding air temperature.

A time-consuming filtering of the temperature measurements can be avoided in this way, in that at times during which, as a result of solar radiation, distorted temperature measurements are to be expected, the temperature measurement most recently deemed to be valid is simply accepted.

A more accurate value for the surrounding air temperature is obtained more quickly with the disclosed method than with air temperature sensors close to the engine, so that a value for the surrounding air temperature can be displayed to the driver particularly promptly and, for example, a possible ice warning can be given in good time. The invention furthermore permits a more effective and/or energy-efficient operation of a vehicle climate-control system.

This is possible because a temperature sensor arranged in the side-mirror reaches the temperature of the surrounding air significantly faster than temperature sensors close to the engine when the vehicle is moving. For that reason, and because ambient/climatic air temperatures usually change relatively slowly, little adverse effect is likely if a previously-measured temperature temporarily assumed to be valid is not in fact the true current air temperature. This is true at least for vehicle operation when the time between consecutive engine operation cycles is relatively short.

According to another aspect of the disclosed embodiment, for cases in which, following a certain duration in an engine-off condition—such as for example after being parked for greater then a threshold length of time—the engine is started again, it is proposed that an initial value for the surrounding air temperature at the time of starting operation is calculated depending on the current temperature measurement, the valid previously-measured value for the surrounding air temperature, and a measured value for the current solar radiation on the vehicle.

The initial value for the air temperature can be calculated further depending on a stored, vehicle-specific factor which represents the specific thermal absorption property of the exterior surface of the side-mirror housing to which the temperature sensor is mounted.

In a particular disclosed embodiment, the initial value New_Oat is calculated as follows:

$$New\_Oat = Prev\_Oat + ((Data\_Now - Prev\_Oat) \times VehCol\_Fkt \times Sun\_Fkt \times Time\_Fkt)$$

where:

Prev_Oat: the most recent valid value for the air temperature before the vehicle stopped Data_Now: current temperature measurement;

VehCol_Fkt: multiplication factor for the specific thermal absorption of the exterior mirror housing surface;

Sun_Fkt: multiplication factor for the current solar radiation; and

Time_Fkt: duration for which the vehicle has been stationary.

Preferably, the initial value for the air temperature is set to the previous valid value if the stationary duration is shorter than the predetermined threshold value and the current temperature measurement is greater than the previous valid value for the air temperature before the vehicle stopped.

Preferably, the initial value for the air temperature is set to the current temperature measurement if the stationary duration is shorter or longer than the predetermined threshold value and the current temperature measurement is less than the previous valid value for the air temperature before the vehicle stopped.

A sun sensor such as is known, for example, from EP 1 853 462 B1, can be used as sensor for the solar radiation on the vehicle. The sensor in that reference is arranged in or on the side-mirror itself, whereas in the embodiment disclosed herein the temperature sensor may be spatially separated from the solar sensor, said solar radiation sensor being arranged on an instrument panel of the vehicle.

There follows a description of exemplary embodiments on the basis of the drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3:
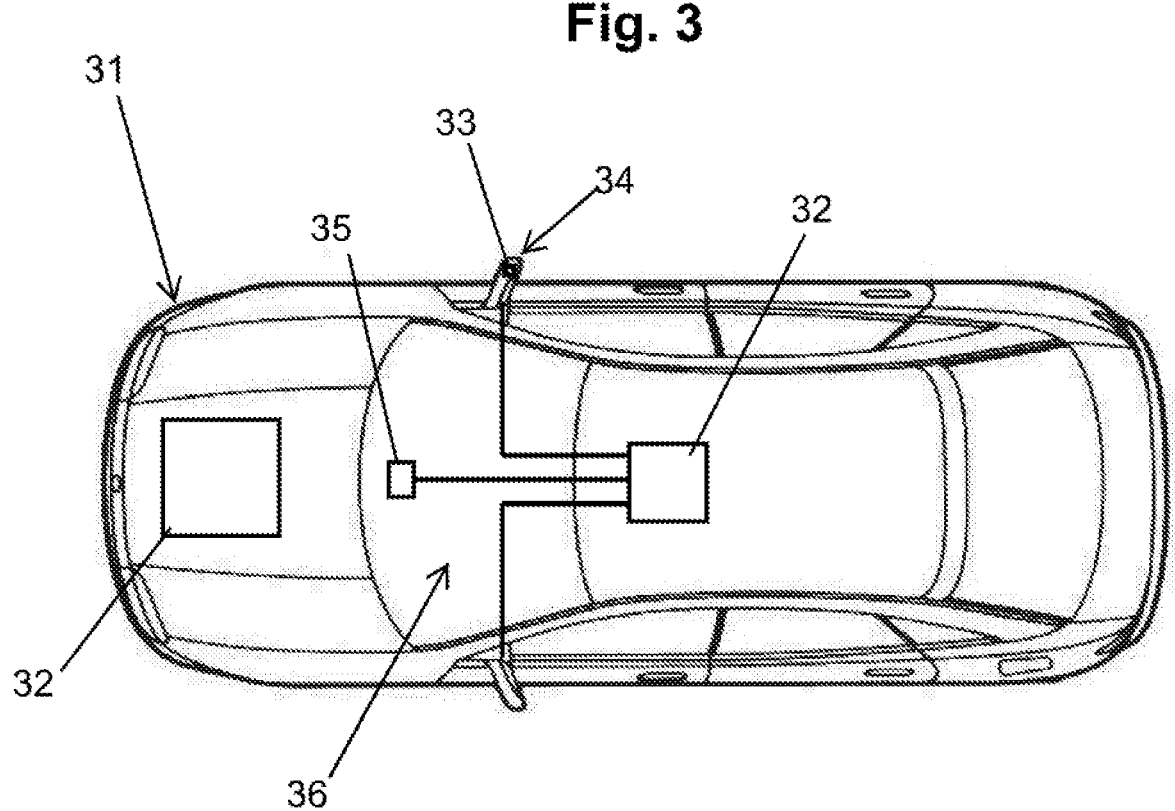
FIG. 3 shows a schematic diagram of a vehicle equipped with apparatus for carrying out a disclosed embodiment of the invention method.

In the exemplary embodiments, a motor vehicle 31 (FIG. 3) with a combustion engine 32 is fitted with a temperature sensor 33 in a side-mirror housing 34 and with a sensor for the solar radiation 35. The solar radiation sensor 25 may be arranged on or adjacent to an instrument panel beneath a windshield 36, a common location for such sensors used in conjunction with a vehicle climate control system. The methods described below can however also be carried out in a hybrid vehicle or an electric vehicle, and it is also possible for multiple temperature sensors to be used for the temperature measurement. For example, a temperature sensor may be provided in or on each of the two side-mirrors, in which case either the mean value or the respectively lower value of the two temperature measurements can be used.

If the vehicle has been stationary for some time with the engine switched off, and the engine has been started (by switching on an ignition key or button, for example), the data required for the steps described below are assembled, and an initialization and a validity check are carried out with respect to some of the data.

A check is made in step S1 as to whether the stationary time EOT was longer than a time threshold value EOT_c, which can either be a constant or can be specified depending on some current vehicle-specific or environment-specific conditions.

If the stationary time EOT was not longer than EOT_c, then a check is made in step S2 as to whether the current temperature measurement Data_Now of the temperature sensor is smaller than a stored air temperature value Prev_Oat, which is the previous air temperature value deemed to be valid before the vehicle became stationary, and was stored before switching off of the engine.

If it is found in step S2 that the current temperature measurement Data_Now is not smaller than Prev_Oat, then in step S3 the previous valid air temperature value Prev_Oat is set as the new valid temperature measurement New_Oat, and is output to vehicle electronics (associated with, for example, the vehicle safety and/or climate-control systems) and and/or displayed to the driver.

If it is found in step S2 that the current temperature measurement Data_Now is smaller than Prev_Oat, then in step S4 the current temperature measurement Data_Now is adopted as the new temperature measurement New_Oat, and is output to the vehicle electronics (associated with, for example, the vehicle safety and/or climate-control systems) and and/or displayed to the driver.

If the result of step S1 is that the stationary duration EOT was longer than EOT_c—after checking, if appropriate, the validity of the current temperature measurement Data_Now of the temperature sensor—a check is made in step S5 as to whether the current temperature measurement Data_Now is smaller than Prev_Oat.

If the result of step S5 is that the current temperature measurement Data_Now is smaller than Prev_Oat, the step S4 described above is carried out.

If it is found in step S5 that the current temperature measurement Data_Now is not smaller than Prev_Oat, then in step S6 the current temperature measurement Data_Now is filtered and set as the new valid temperature measurement New_Oat, and is output to the vehicle electronics (associated with, for example, the vehicle safety and/or climate-control systems) and and/or displayed to the driver.

Figure 1:
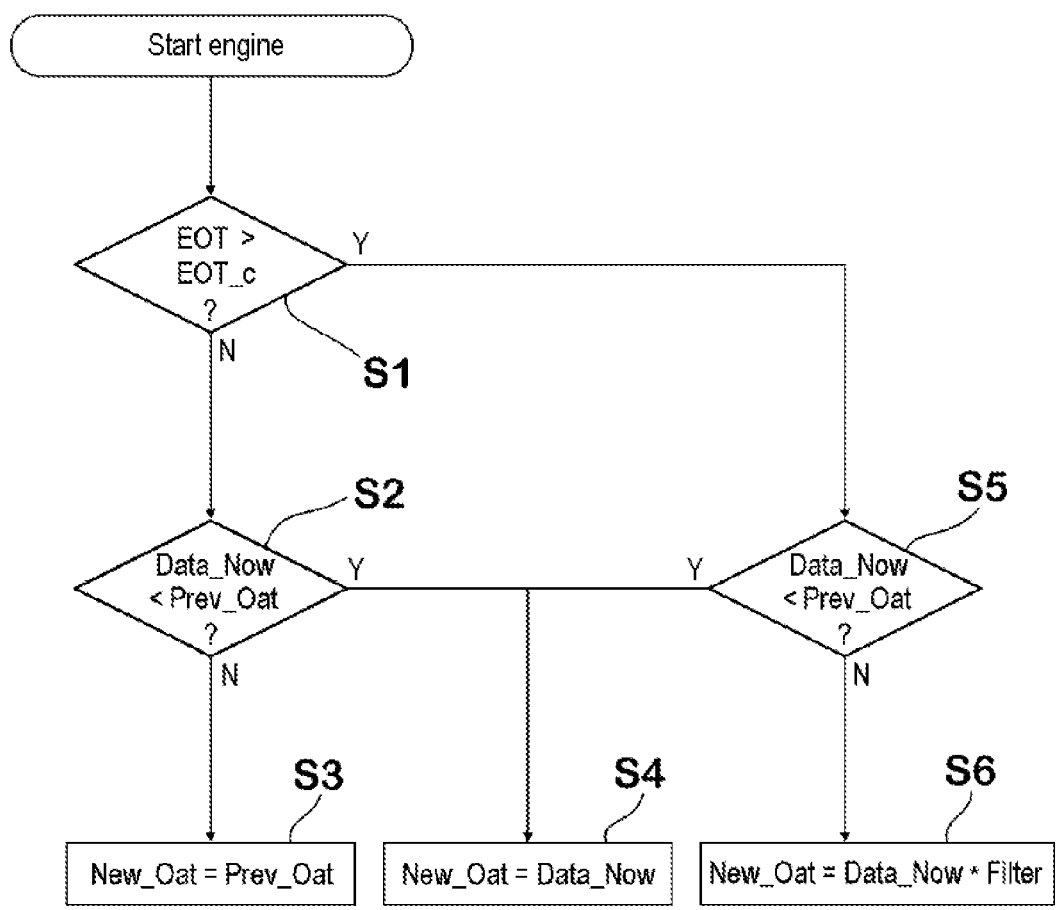
FIG. 1 shows a flow diagram for determining an initial value for the air temperature in the surroundings of a vehicle.
Figure 2:
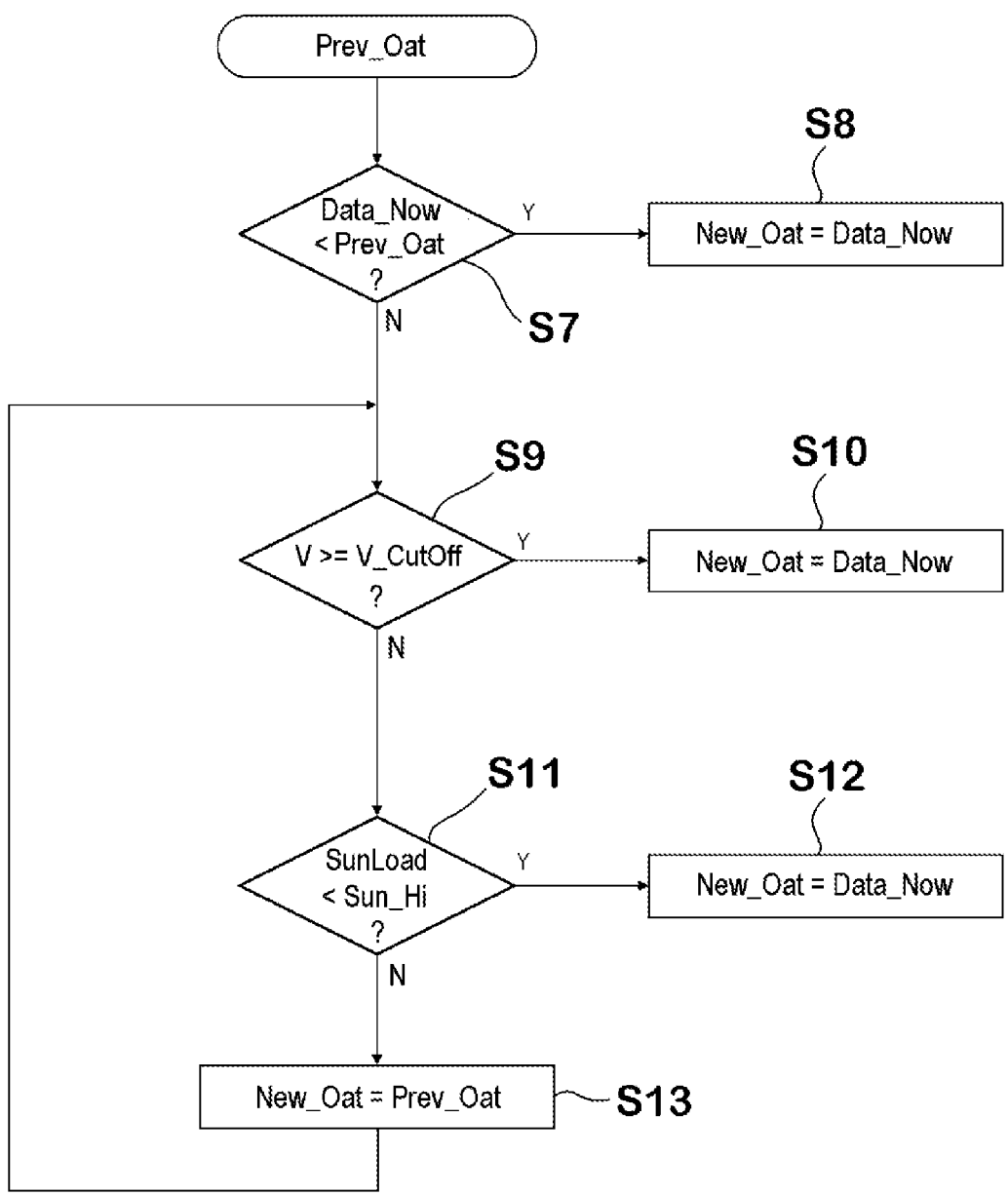
FIG. 2 shows a flow diagram for determining the surrounding air temperature when the vehicle is in operation.

The filtering consists, in particular, of calculating New_Oat as follows:

$$New\_Oat = Prev\_Oat + ((Data\_Now - Prev\_Oat) \times VehCol\_Fkt \times Sun\_Fkt \times Time\_Fkt)$$

where:

Prev_Oat: the most recent valid value for the air temperature before the vehicle stopped Data_Now: current temperature measurement VehCol_Fkt: multiplication factor for the specific thermal absorption at the outer surface of the mirror housing due to its paint color and/or material Sun_Fkt: multiplication factor for the currently measured solar radiation Time_Fkt: duration for which the vehicle has been stationary The new, valid temperature measurement New_Oat specified in steps S3, S4 or S6 is also the initial value Prev_Oat for the further method for determination of the outside temperature carried out subsequently during operation of the vehicle, which is illustrated in more detail in FIG. 2.

Referring to FIG. 2, a check is made in step S7 as to whether the current temperature measurement Data_Now is smaller than the initial value Prev_Oat. If yes, the new, valid temperature measurement New_Oat is set to the current temperature measurement Data_Now, and is output to the vehicle electronics (associated with, for example, the vehicle safety and/or climate-control systems) and and/or displayed to the driver (S8).

If no, then a check is made in step S9 as to whether the current vehicle speed V is at least equal to a speed threshold value V_CutOff, which can be constant, but is preferably is a variable speed value which can be specified depending on some current vehicle-specific or environment-specific conditions. If yes, New_Oat is set to Data_Now, and is output to the vehicle electronics and displayed to the driver (S10).

If no, then a check is made in step S11 as to whether the measured value SunLoad for the solar radiation on the vehicle is less than a solar radiation threshold value Sun_Hi. If yes, New_Oat is set to Data_Now, and is output to the vehicle electronics and displayed to the driver (S12).

If no, New_Oat is set to Prev_Oat, and is output to the vehicle electronics and displayed to the driver (S13), and the method continues with step S9.

During ongoing vehicle operation, the method illustrated in FIG. 2 can be carried out at certain time intervals, starting repeatedly from the beginning.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a climate-control system of a vehicle using an initial air temperature (New_Oat) outside the vehicle calculated based upon a current air temperature (Data_Now) measured by a temperature sensor located on a side-mirror of the vehicle, comprising:
    storing a previous air temperature (Prev_Oat) at or before an engine shut-down time;
    at an engine re-start time: a) operating the temperature sensor on the side-mirror to determine the current air temperature (Data_Now); b) measuring a solar radiation on the vehicle; and c) determining a duration (EOT) since the previous air temperature was stored;
    if, at the engine re-start time; a) the duration (EOT) exceeds a threshold value (EOT_c); and b) the current air temperature (Data_Now) is higher than the previous air temperature (Prev_Oat), then
    calculating the initial air temperature (New_Oat) from: a) the current air temperature (Data_Now), b) the previous air temperature (Prev_Oat), and c) the solar radiation; and
    operating the climate-control system using the initial temp (New_Oat).

2. The method of claim 1, wherein the initial air temperature is further calculated from: a thermal absorption factor for the side-mirror housing.

3. The method of claim 2, wherein the initial air temperature (New_Oat) is calculated as follows:

New_Oat=Prev_Oat+((Data_Now−Prev_Oat)×VehCol_Fkt×Sun_Fkt×Time_Fkt)

where:
Prev_Oat is the previous air temperature;
Data_Now is the current air temperature:
VehCol_Fkt is the thermal absorption factor for the side-mirror housing;
Sun_Fkt is a multiplication factor for the solar radiation; and
Time_Fkt is the duration for which the vehicle has been stationary.

4. The method of claim 1, wherein the solar radiation on the vehicle is determined by a sensor disposed on an instrument panel of the vehicle.

5. The method of claim 1, wherein:
if the duration is shorter than the threshold value and the current air temperature is higher than the previous air temperature, the initial air temperature is set to the previous air temperature.

6. The method of claim 1 wherein:
if the current air temperature measurement is lower than the previous air temperature, then the initial air temperature is set to the current air temperature.

7. A method for operating a climate-control system of a vehicle using an initial air temperature (New_Oat) outside the vehicle calculated based upon a current air temperature (Data_Now) measured by a temperature sensor located on a side-mirror of the vehicle, comprising:
    storing a thermal absorption factor for a housing of the side-mirror;
    storing a previous air temperature (Prev_Oat) at or before an engine shut-down time;
    at an engine re-start time: a) operating the temperature sensor on the side-mirror to determine the current air temperature (Data_Now); b) measuring a solar radiation on the vehicle using a sensor disposed on an instrument panel of the vehicle; and c) determining a duration (EOT) since the previous air temperature was stored;
    if, at the engine re-start time; a) the duration (EOT) exceeds a threshold value (EOT_c); and b) the current air temperature (Data_Now) is higher than the previous air temperature (Prev_Oat), then
    calculating the initial air temperature (New_Oat) from: a) the current air temperature (Data_Now), b) the previous air temperature (Prev_Oat), c) the solar radiation, and d) the thermal absorption factor; and
    operating the climate-control system using the initial temp (New_Oat).

8. The method of claim 7, wherein:
if the duration is shorter than the threshold value and the current air temperature is higher than the previous air temperature, the initial air temperature is set to the previous air temperature.

9. The method of claim 7 wherein:
if the current air temperature measurement is lower than the previous air temperature, then the initial air temperature is set to the current air temperature.

10. A method comprising:
    at an engine re-start time of a vehicle, if: a duration since an earlier engine shut-down exceeds a threshold value; and a measured current air temperature is higher than a previous temperature before the engine shut-down, then
    calculating an initial air temperature from: a current air temperature, the previous temperature, and a solar radiation on the vehicle; and
    operating a vehicle climate-control system based on the initial air temperature.

11. The method of claim 10, wherein the current air temperature is measured by a sensor mounted adjacent to a side-mirror housing.

12. The method of claim 10, wherein the initial air temperature is further calculated from: a thermal absorption factor for the side-mirror housing.

13. The method of claim 12, wherein the initial air temperature (New_Oat) is calculated as follows:

$$New\_Oat = Prev\_Oat + ((Data\_Now - Prev\_Oat) \times VehCol\_Fkt \times Sun\_Fkt \times Time\_Fkt)$$

where:
Prev_Oat is the previous air temperature;
Data_Now is the current air temperature;
VehCol_Fkt is the thermal absorption factor for the side-mirror housing;
Sun_Fkt is a multiplication factor for the solar radiation; and
Time_Fkt is the duration for which the vehicle has been stationary.

14. The method of claim 10, wherein the solar radiation on the vehicle is determined by a sensor disposed on an instrument panel of the vehicle.

15. The method of claim 10, wherein:
if the duration is shorter than the threshold value and the current air temperature is higher than the previous temperature, the initial air temperature is set to the previous temperature.

16. The method of claim 10 wherein:
if the current air temperature is lower than the previous temperature, then the initial air temperature is set to the current air temperature.

\* \* \* \* \*